US010674048B2

(12) United States Patent
Guan et al.

(10) Patent No.: US 10,674,048 B2
(45) Date of Patent: Jun. 2, 2020

(54) PANORAMA STITCHING CAMERA (71) Applicant: Hangzhou Hikvision Digital Technology Co., Ltd., Hangzhou (CN)

(72) Inventors: Hongjie Guan, Hangzhou (CN); Zhan Ye, Hangzhou (CN); Caisheng Yan, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 17 days.

(21) Appl. No.: 15/751,381

(22) PCT Filed: May 19, 2016

(86) PCT No.: PCT/CN2016/082614
§ 371 (c)(1),
(2) Date: Feb. 8, 2018

(87) PCT Pub. No.: WO2017/071185
PCT Pub. Date: May 4, 2017

(65) Prior Publication Data
US 2018/0241915 A1 Aug. 23, 2018

(30) Foreign Application Priority Data
Oct. 28, 2015 (CN) ..................... 2015 2 0843121 U (51) Int. Cl.
*H04N 5/225* (2006.01)
*F16M 11/08* (2006.01)
(Continued)

(52) U.S. Cl.
CPC ........... *H04N 5/2251* (2013.01); *F16M 11/08* (2013.01); *F16M 11/18* (2013.01); *F16M 13/02* (2013.01);
(Continued)

(58) Field of Classification Search
CPC .................................................. H04N 5/2251
(Continued)

(56) References Cited

U.S. PATENT DOCUMENTS 5,721,585 A  2/1998  Keast
6,144,406 A  11/2000  Girard et al.
(Continued)

FOREIGN PATENT DOCUMENTS

CN  200966104 Y  10/2007
CN  104079918 A  10/2014
CN  205071148 U  3/2016

OTHER PUBLICATIONS

Extended European Search Report (EESR) for EP 16858631.1 dated May 27, 2019 (6 pages).
(Continued)

*Primary Examiner* — Joel W Fosselman
(74) *Attorney, Agent, or Firm* — Shumaker, Loop & Kendrick, LLP (57) ABSTRACT

The present application relates to a panorama stitching camera, including: a base provided with a fixing plate; a main shaft passing vertically through the fixing plate; and a plurality of lenses disposed at one end of the main shaft, wherein, a limiting protrusion and a shaft end retaining ring that abut respectively against two opposite sides of the fixing plate are disposed at the other end of the main shaft. When the angle of view of the panorama stitching camera is being adjusted, the plurality of lenses can rotate around the axis of the main shaft simply by rotation of the main shaft. Thus, the adjustment of the angle of view of the lens along the circumferential direction of the main shaft is achieved, and the operation of adjusting the angle of view of the panorama stitching camera is greatly simplified. Thus, the problem that (Continued)

the angle of view of an existing panorama stitching camera cannot be adjusted readily during use is solved.

18 Claims, 7 Drawing Sheets

(51) Int. Cl.
  *G03B 37/04*    (2006.01)
  *F16M 11/18*    (2006.01)
  *F16M 13/02*    (2006.01)
  *H04N 5/232*    (2006.01)

(52) U.S. Cl.
  CPC ............ *G03B 37/04* (2013.01); *H04N 5/225* (2013.01); *H04N 5/2258* (2013.01); *H04N 5/23238* (2013.01); *H04N 5/23296* (2013.01)

(58) Field of Classification Search
  USPC ......................................................... 348/373
  See application file for complete search history.

(56) References Cited

U.S. PATENT DOCUMENTS

| | | | |
|---|---|---|---|
| 2003/0032863 A1* | 2/2003 | Kazakevich | A61B 1/00105 600/173 |
| 2014/0362287 A1* | 12/2014 | Chung | H04N 5/23238 348/376 |

OTHER PUBLICATIONS

English Translation of International Search Report for PCT/CN2016/082614 dated Aug. 26, 2016 (2 pages).

\* cited by examiner

PANORAMA STITCHING CAMERA

The present application claims the priority to a Chinese patent application No. 201520843121.2, filed with the State Intellectual Property Office of People's Republic of China on Oct. 28, 2015 and entitled "PANORAMA STITCHING CAMERA", which is incorporated herein by reference in its entirety.

TECHNICAL FIELD

The application relates to security equipment, in particular to a panorama stitching camera.

BACKGROUND

With the rapid development of electronic communication technology, monitoring cameras whose orientation is easy to be adjusted and auxiliary system thereof have been widely used in various industries to provide real-time surveillance and video records for scenes that may act as the basis of subsequent reproduction of the scenes. The cameras may be, for example, installed in a crowded place (such as a station) to prevent theft from happening to some extent, installed on a crossroad near a residential area or supermarket to improve safety in such areas, installed in a production line to monitor quality of products, or applied to a traffic intersection to monitor the movement of vehicles in real time. With the popularization and extensive application of monitoring cameras, demand for video information capture and monitoring is enhanced.

A panorama stitching camera is a monitoring camera that is typically used in large angle of field of view monitoring. A panorama stitching camera employs a plurality of high performance video sensors (i.e., a plurality of lenses) and generates a video stream with high resolution and large angle of field of view by using a fusion and stitching algorithm. The angle of field of view of existing panorama stitching camera is hard to be adjusted.

SUMMARY

The present application is directed to solve the technical problem that the angle of view of an existing panorama stitching camera cannot be adjusted readily during use.

To solve the technical problem above, the present application provides a panorama stitching camera, including: a base provided with a fixing plate; a main shaft passing vertically through the fixing plate; and a plurality of lenses disposed at one end of the main shaft, wherein, a limiting protrusion and a shaft end retaining ring that abut respectively against two opposite sides of the fixing plate are disposed at the other end of the main shaft.

When the angle of view of the panorama stitching camera is being adjusted, the plurality of lenses can rotate around the axis of the main shaft simply by rotation of the main shaft. Thus, the adjustment of the angle of view of the lenses along a circumferential direction of the main shaft is achieved, and the operation of adjusting the angle of view of the panorama stitching camera is greatly simplified. Thus, the problem that the angle of view of an existing panorama stitching camera cannot be adjusted readily during use is solved.

In one specific implementation of the present application, the shaft end retaining ring includes an elastic diaphragm that is connected to an end of the main shaft and parallel to the fixing plate, and a convex ring that protrudes toward the fixing plate from one side of the elastic diaphragm and abuts against the fixing plate. The elastic diaphragm elastically deforms after the fixing plate is clamped by the shaft end retaining ring and an limiting protrusion, so that the pressure between the convex ring and the fixing plate, and the pressure between the limiting protrusion and the fixing plate are within a reasonable range. As a result, both the situation that the main shaft is not able to rotate due to excessive friction between the main shaft and the fixing plate and the situation that the lenses shake or wobble due to insufficient friction between the main shaft and the fixing plate can be avoided. The complexity of assembly is thus reduced.

In one specific implementation of the present application, the elastic diaphragm is ring-shaped, and the elastic diaphragm, the main shaft, and the convex ring have the same axis. Forces can be exerted on the convex ring, the elastic diaphragm and the main shaft more uniformly and reasonably.

In one specific implementation of the present application, the shaft end retaining ring further includes a sleeve that protrudes from another side of the elastic diaphragm in the direction away from the fixing plate and has the same axis and inner diameter as the convex ring. The sleeve and the convex ring are located on both sides of the elastic diaphragm respectively. The sleeve reinforces the structure at the edge of the elastic diaphragm to avoid the flip of the convex ring.

In one specific implementation of the present application, the panorama stitching camera further includes a heater disposed at the end of the main shaft at which the lenses disposed; the heater is configured to heat the plurality of lenses simultaneously. Since the lenses can be heated by the heater, the panorama stitching camera is able to operate at low temperature. Thus the application of the panorama stitching camera is broadened.

In one specific implementation of the present application, the panorama stitching camera further includes a fixing frame, a plurality of lens holders disposed on the fixing frame, and a ball core adjustment shaft fixed on the fixing frame, wherein, the ball core adjustment shaft is pivotally connected to the main shaft, and each of the plurality of lenses is placed on one of the plurality of lens holders. As the lenses can be adjusted along two axes, the adjustment range of the angle of view of the lenses is greatly increased, and flexibility and adaptability of the panorama stitching camera are improved.

In one specific implementation of the present application, a pivot tube is disposed at an end of the main shaft facing away from the fixing plate; an inner wall of the pivot tube is provided with internal teeth; the ball core adjustment shaft is rotatably disposed in the pivot tube; and an outer peripheral face of the ball core adjustment shaft is provided with external teeth that engage with the internal teeth. After the adjustment of angle of view is accomplished, the internal teeth and the external teeth are engaged with each other. The pivot mechanism is thus locked so that the posture of the lenses is relatively fixed.

In one specific implementation of the present application, a gap greater than a height required for engaging the internal teeth and the external teeth is formed between the ball core adjustment shaft and the inner wall of the pivot tube; a part of the pivot tube on which the internal teeth are disposed is provided with a through-hole extending radially; a locking bar perpendicular to the axis of the pivot tube and protruding from the pivot tube is mounted in the through-hole; and the locking bar is detachably connected to the ball core adjustment shaft. As such, the disengagement of the external teeth and the internal teeth can be achieved by adjusting the ball core adjustment shaft radially. The pivot mechanism is easy to be locked or unlocked with this reasonable structural design.

In one specific implementation of the present application, the locking bar includes a threaded segment and a protruding segment; the threaded segment passes through the through-hole and is screwed to the ball core adjustment shaft; and the minimum external diameter of the protruding segment is larger than the size of the through-hole in an axial direction of the pivot tube. When the locking bar can be locked to engage the internal teeth with the external teeth, a shaft shoulder of the locking bar can abut against the outer peripheral face of the pivot tube, so that the ball core adjustment shaft is tensed to prevent the disengagement of the internal teeth from the external teeth.

In one specific implementation of the present application, the fixing plate, the main shaft, the fixing frame, and the lens holders are all metallic members. As a result, external surfaces of most of the elements within the panorama stitching camera are electrically connected with each other. The static within the panorama stitching camera are thus eliminated. In addition, the fixing plate, the main shaft, the fixing frame, and the lens holders are connected in sequence so that the lens holders can transfer the heat produced by the lenses to the fixing plate which serves to dissipate the heat. Thus, the ability of the panorama stitching camera in terms of heat dissipation is enhanced and the reliability of the panorama stitching camera is improved.

In one specific implementation of the present application, the elastic diaphragm is a corrugated diaphragm. The corrugated diaphragm has a small elastic modulus and a large range of elastic deformation so that the size of the elastic diaphragm can be reduced and the panorama stitching camera is thus more compact.

BRIEF DESCRIPTION OF THE DRAWINGS

Features and advantages of the present application will be better understood with reference to the drawings, which are illustrative and should not be construed as limitation of the present application, wherein.

REFERENCE SIGNS 1. panorama stitching camera; 11. ball core cap; 111. via; 112. left cap; 113. right cap; 12. fixing frame; 121. lens; 122. supporting plate; 13. ball core adjustment shaft; 131. external teeth; 14. main shaft; 141. shaft lever; 142. pivot tube; 1421. internal teeth; 1422. through-hole; 143. limiting protrusion; 144. lens holder; 145. mounting frame; 146. substrate; 147. adjustment screw; 148. spiral spring; 15. locking bar; 151. thread segment; 152. protruding segment; 2. base; 21. inner cover; 22. mounting base; 221. riser; 23. fixing plate; 231. main shaft hole; 3. protection cover; 31. transparent cover; 32. bottom case; 33. decorative ring; 5. heater; 6. shaft end retaining ring; 61. elastic diaphragm; 62. sleeve; 63. convex ring; 7. mainboard; 99. connector.

In the drawings, the same reference signs denote the same components. The drawings are not drawn in the actual scale.

DETAILED DESCRIPTION

The present application will be described in further details with reference to the drawings.

Figure 1:
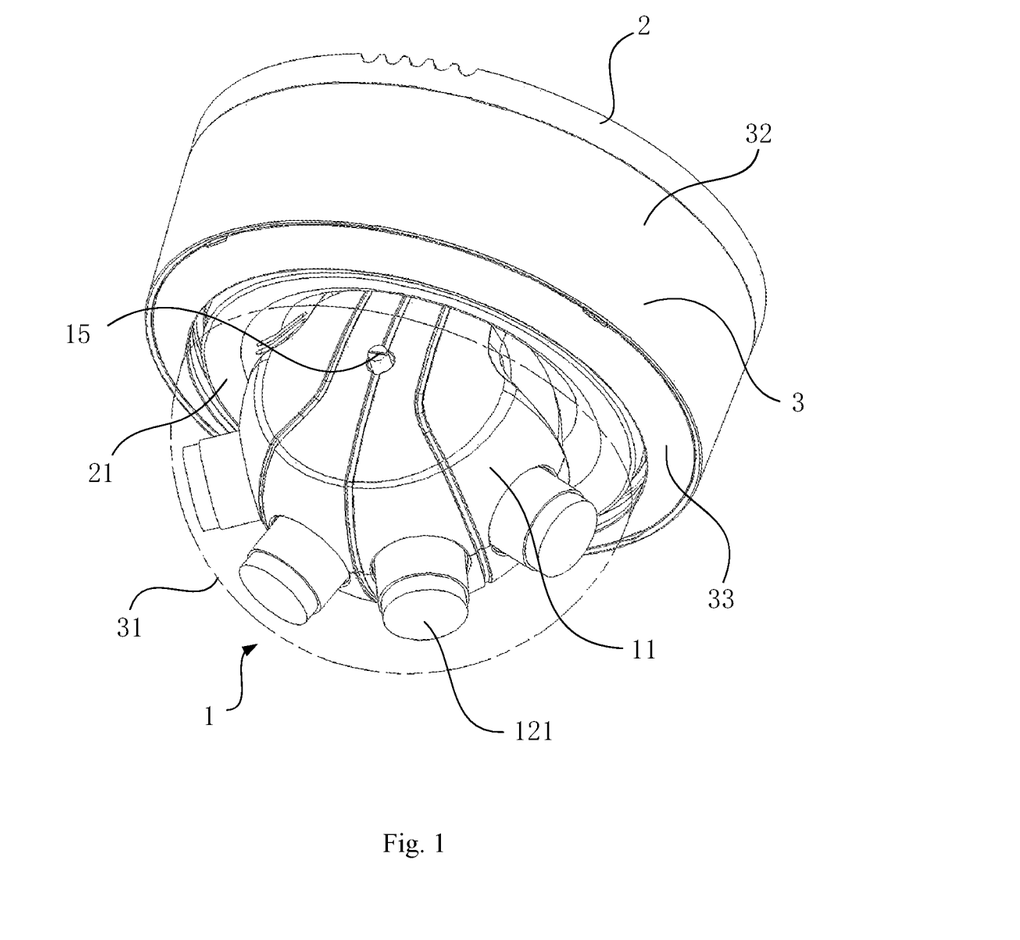
FIG. 1 illustrates a perspective view of a panorama stitching camera according to an embodiment of the present application.
Figure 2:
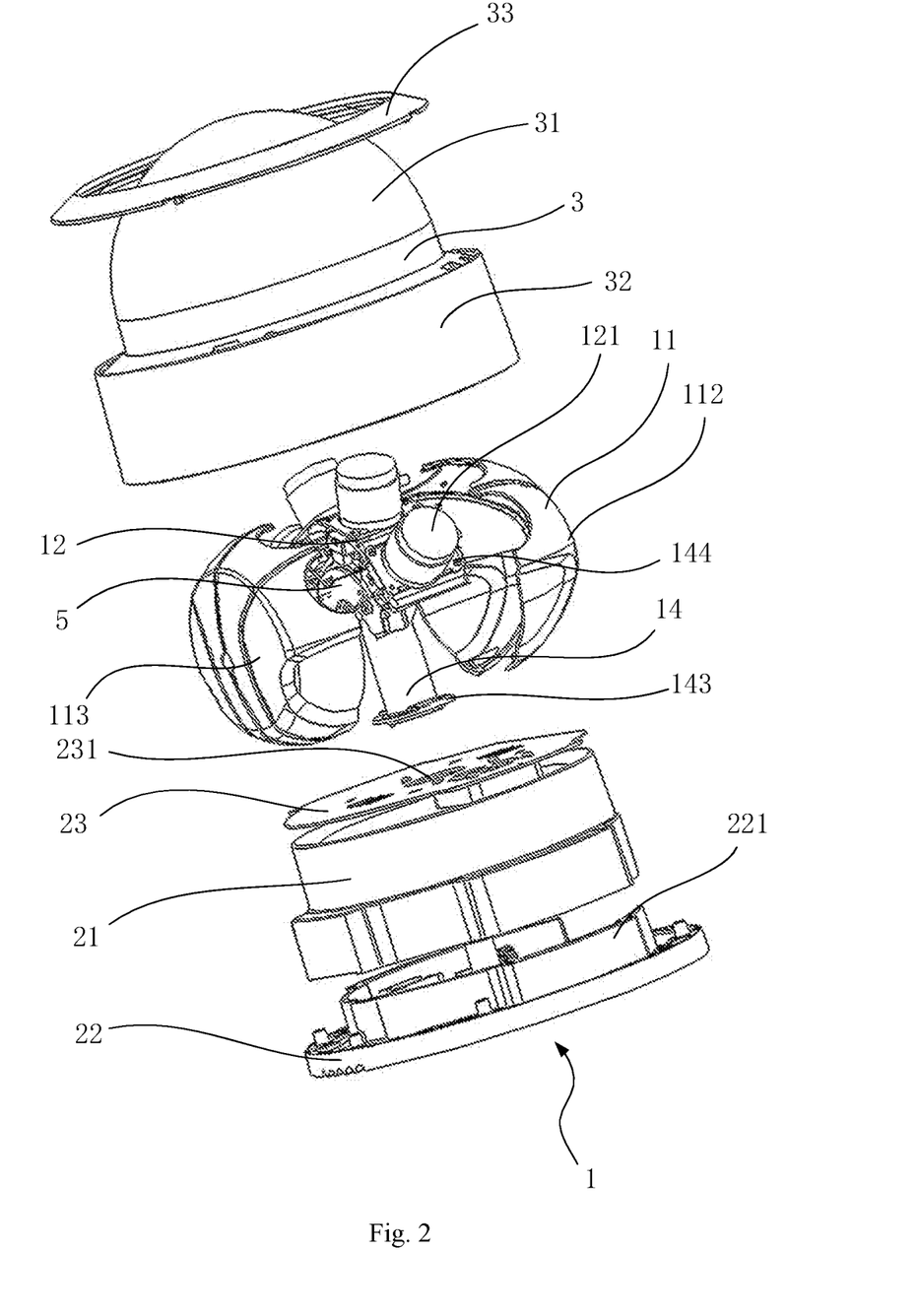
FIG. 2 illustrates an exploded schematic view of the panorama stitching camera in FIG. 1.
Figure 3:
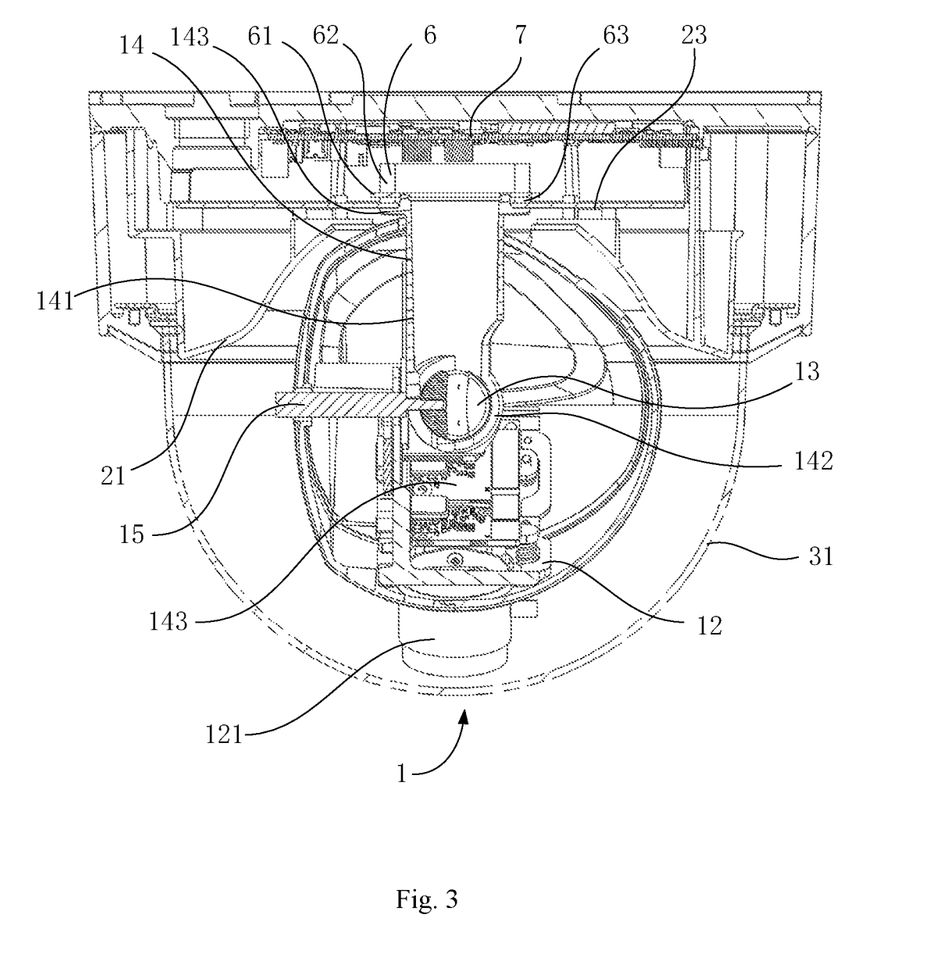
FIG. 3 illustrates a full section view of the panorama stitching camera in FIG. 1.

As shown in FIG. 1 to FIG. 3, a panorama stitching camera 1 includes a protection cover 3, a base 2, a ball core mechanism, a main shaft 14, a mainboard 7 and a shaft end retaining ring 6. The protection cover 3 covers and joints the base 2, forming a housing of the panorama stitching camera 1. The housing accommodates the ball core mechanism, the main shaft 14, and the shaft end retaining ring 6.

As shown in FIG. 2, the protecting cover 3 includes a transparent cover 31, a decorative ring 33 and a bottom case 32. The bottom case 32 has a substantially tubular shape. The transparent cover 31 is a hemispherical shape. The bottom of the transparent cover 31 is fastened to one end of the bottom case 32. The bottom case 32 is connected to the base 2, typically by a bolt. The decorative ring 33 is mounted on the base 2 to cover holes on the bottom case 32 so that the panorama stitching camera 1 can have a better appearance.

Figure 4:
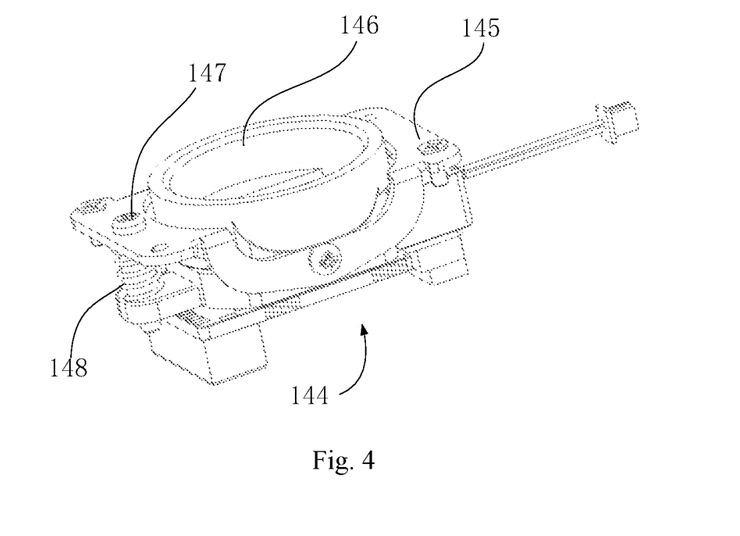
FIG. 4 illustrates a perspective view of a lens holder in FIG. 2.

The base 2 includes a mounting base 22, an inner cover 21 and a fixing plate 23. The mounting base 22 is a substantially plate-like structure. As shown in FIG. 2 and FIG. 4, the mounting base 22 is mounted on a substrate 146 so that the base 2 is fixed on the substrate 146, which can be a ceiling or wall. The mounting base 22 is provided with a riser 221 protruding from one side. The riser 221 is perpendicular to the mounting base 22. The riser 221 has a substantially ring shape. The mainboard 7 is accommodated in the riser 221. The mainboard 7 includes a driving circuit and a power supply to drive the panorama stitching camera 1 to shoot. The mainboard 7 is typically a PCB circuit board. The fixing plate 23 covers and joints the riser 221 of the mounting base 22, and is fixed relative to the riser 221. The riser 221 can be connected to the fixing plate 23 by a bolt. The fixing plate 23 and the mounting base 22 form a cavity structure that accommodates the mainboard 7. The fixing plate 23 is provided with a main shaft hole 231 that penetrates the fixing plate 23. The main shaft hole 231 is preferably placed at the center of the mainboard 7. The inner cover 21 has a substantially tubular shape. The inner cover 21 is fastened to the mounting base 22 and accommodates the riser 221 and the mainboard 7. The bottom of the inner cover 21 is provided with a via which the main shaft 14 passes through. With the inner cover 21, the panorama stitching camera 1 will have a better appearance.

As shown in FIG. 3, the main shaft 14 includes a shaft lever 141 and a limiting protrusion 143. The main shaft 14 can rotate around its axis. The outer contour of the shaft lever 141 has a substantially cylindrical shape. The shaft has preferably a tubular shape. The limiting protrusion 143 is disposed at one end of the shaft lever 141, and protrudes outward, in radical direction, from the outer peripheral face of the shaft lever 141. The shaft lever 141 passes through the main shaft hole on the fixing plate 23. The external diameter of the shaft end retaining ring 6 is larger than that of the main shaft hole. The shaft end retaining ring 6 and the limiting protrusion 143 abut against opposite sides of the fixing plate 23 respectively. The shaft end retaining ring 6 and the limiting protrusion 143 restrict the main shaft 14 to prevent axial motion of the main shaft 14 relative to the fixing plate 23, i.e., restrict the main shaft from moving along its axis. The main shaft 14 can rotates around its axis, which is the central line of the main shaft 14.

The ball core mechanism includes a plurality of lenses 121. The ball core mechanism is fixed to an end of the main shaft 14 facing away from the fixing plate 23. The plurality of lenses 121 face away from the main shaft 14.

During the adjustment of the angle of view of the panorama stitching camera 1, the lenses 121 can be rotated around the axis of the main shaft 14 simply by rotating the main shaft 14, so that the angles of view of the lenses 121 are adjusted circumferentially. As a result, adjustment of angle of view of the panorama stitching camera 1 is greatly simplified.

Further, as shown in FIG. 3, the shaft end retaining ring 6 includes an elastic diaphragm 61 and a convex ring 63. The elastic diaphragm 61 is a substantially ring-shaped structure. The elastic diaphragm 61 is an elastic member that allows elastic deformation, such as elastic torsion. The middle of the elastic diaphragm 61 is fixed relative to the end of the main shaft 14. The elastic diaphragm 61 can be connected to the main shaft 14 by a bolt. The convex ring 63 protrudes towards the fixing plate 23 from one side of the elastic diaphragm 61. One end of the convex ring 63 is fixed to the elastic diaphragm 61, and the other end abuts against the fixing plate 23. The convex ring 63 is located at the edge of the elastic diaphragm 61. The elastic diaphragm 61 elastically deforms after the fixing plate 23 is clamped by the shaft end retaining ring 6 and the limiting protrusion 143, so that the pressure between the convex ring 63 and the fixing plate 23 and the pressure between the limiting protrusion 143 and the fixing plate 23 are within a reasonable range. As a result, both the situation that the main shaft 14 is not able to rotate due to excessive friction between the main shaft 14 and the fixing plate 23 and the situation that the lenses 121 shake or wobble due to insufficient friction between the main shaft 14 and the fixing plate 23 can be avoided. The complexity of assembly is thus reduced.

Furthermore, the elastic diaphragm 61 is a ring-shaped. The main shaft 14, the elastic diaphragm 61 and the convex ring 63 have the same axis. With such a configuration, the force can be exerted on the convex ring 63, the elastic diaphragm 61 and the main shaft 14 more uniformly and reasonably.

Furthermore, the shaft end retaining ring 6 further includes a sleeve 62 that protrudes from another side of the elastic diaphragm 61 in a direction away from the fixing plate and has the same axis and inner diameter as the convex ring 63. The sleeve 62 and the convex ring 63 are located on both sides of the elastic diaphragm 61 respectively. The sleeve 62 reinforces the structure at the edge of the elastic diaphragm 61 to avoid the flip of the convex ring 63.

Furthermore, the elastic diaphragm 61 is a corrugated diaphragm. The profile of the corrugated diaphragm can be any of arc, sine-shape, triangle, and trapezoid. The corrugated diaphragm is preferably a wave structure in concentric ring form. The corrugated diaphragm is able to deform elastically so that the size of the elastic diaphragm 61 can be reduced and thus the panorama stitching camera 1 can be more compact.

In particular, the corrugated diaphragm has a small elastic modulus and a large range of elastic deformation so that the size of the elastic diaphragm can be reduced and thus the panorama stitching camera 1 can be more compact.

Furthermore, the panorama stitching camera 1 further includes a ball core cap 11. The ball core cap 11 includes a left cap 112 and a right cap 113. The ball core cap 11 has a substantially spherical housing and accommodates the ball core mechanism. Both the left cap 112 and the right cap 113 is a substantially hemispherical housing structure. The left cap 112 and the right cap 113 can joint each other, forming a substantially spherical housing. Both the left cap 112 and the right cap 113 are provided with a plurality of breaches. Each of the breaches on the left cap 112 aligns with a corresponding one on the right cap 113 to form a via. A lens 121 or the main shaft 14 passes through the via. Thus, the lens 121 protrudes from the ball core cap 11, so that the panorama stitching camera 1 has a better appearance. Meanwhile, the ball core cap 11 also protects the ball core mechanism.

Furthermore, the main shaft 14 further includes a pivot tube 142 and a ball core adjustment shaft 13. The pivot tube 142 is located on one end of the shaft lever 141 facing away from the fixing plate 23. The ball core mechanism includes a fixing frame 12 on which the lenses 121 and other members are mounted, and a plurality of lens holders 144 mounted on the fixing frame 12. The fixing frame 12 includes an arc fixing bracket and supporting plates 122. The plurality of lens holders 144 are arranged in sequence along the arc fixing bracket. Each of the plurality of lenses 121 is placed on one of the plurality of lens holders 144. The supporting plates 122 are disposed at the inner side of the arc fixing bracket and extends in an opposite direction. The supporting plates 122 are perpendicular to the arc fixing bracket. End faces of the ball core adjustment shaft 13 are provided with threaded holes. Each of the supporting plates 122 is provided with mounting holes corresponding to the threaded holes. As such, the end faces of the ball core adjustment shaft 13 can be connected to the supporting plates 122 by bolts. The axis of the shaft lever 141 is perpendicular to the axis of the pivot tube 142. A ball core adjustment shaft 13 is rotatably disposed in the pivot tube 142 so as to be pivotally connected to the pivot tube 142. The ball core mechanism is able to swing relative to the main shaft 14, and the lenses 121 swing with the swing of the ball core mechanism. The lenses 121 can thus be adjusted along two axes, i.e., the orientations of the lenses 121 can be adjusted by the rotation of the main shaft 14 relative to the base 2 and/or the rotation of the ball core adjustment shaft 13 in the pivot 142. The adjustment range of the angles of view of the lenses 121 is greatly increased, and flexibility and adaptability of the panorama stitching camera 1 are improved.

Furthermore, as shown in FIG. 4, the lens holder 144 includes a substrate 146, a mounting frame 145 and an adjustment assembly. The mounting frame 145 includes four borders that are connected end to end to form a rectangle frame. The mounting frame 145 is mounted around and hinged to the substrate 146. In particular, two opposite borders of the mounting frame 145 are hinged to the substrate 146. The adjustment assembly includes an adjustment screw 147 and a spiral spring 148. The adjustment screw 147 passes through one of another two borders to be screwed to the substrate 146. The spiral spring 148 is mounted around the adjustment screw 147. Two ends of the spiral spring 148 abut against the mounting frame 145 and the substrate 146 respectively. The mounting frame 145 is fixed to the fixing frame 12, for example, via a bolt or screw. The lens 121 is mounted on the substrate 146. The adjustment screw 147 is rotated so that the orientation of the lens 121 is adjusted as the substrate 146 swings relative to the mounting frame 145. Thus, the orientation of each of the lenses 121 can be adjusted individually.

Figure 6:
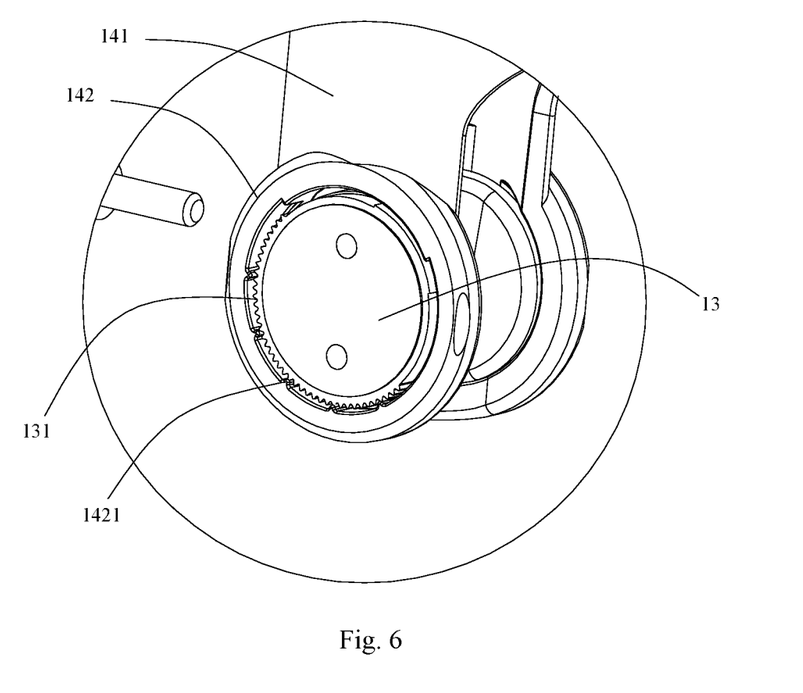
FIG. 6 illustrates an enlarged view of the part A in FIG. 5.

Furthermore, as shown in FIG. 6, the inner wall of the pivot tube 142 is provided with internal teeth 1421, and the outer peripheral face of the ball core adjustment shaft 13 is provided with external teeth 131 that engage with the internal teeth 1421. The internal teeth 1421 and the external teeth 131 constitute a clutch structure.

When the internal teeth 1421 and the external teeth 131 are not engaged with each other, the ball core adjustment shaft 13 can rotate in the pivot tube 142, and an operator can rotate the ball core cap 11 to conduct a position adjustment. The internal teeth 1421 and the external teeth 131 will be adjusted to be engaged with each other as the panorama stitching camera 1 rotates to a proper position. As a result, the ball core adjustment shaft 13 is not able to rotate relative to the pivot tube 142, so that the position of the fixing frame 12 will not change any more, the adjustment of orientations of the lenses 121 is hereby accomplished. As such, the clutch structure disposed on the ball core mechanism may simply the entire process of adjustment, reduce time for adjustment, and improve efficiency of adjustment.

A gap greater than a height required for engaging the internal teeth 1421 with external teeth 131 is formed between the ball core adjustment shaft 13 and the pivot tube 142, thus the ball core adjustment shaft 13 can be moved relative to the pivot tube 142 in radical direction so that the internal teeth 1421 disengage from the external teeth 131.

Figure 7:
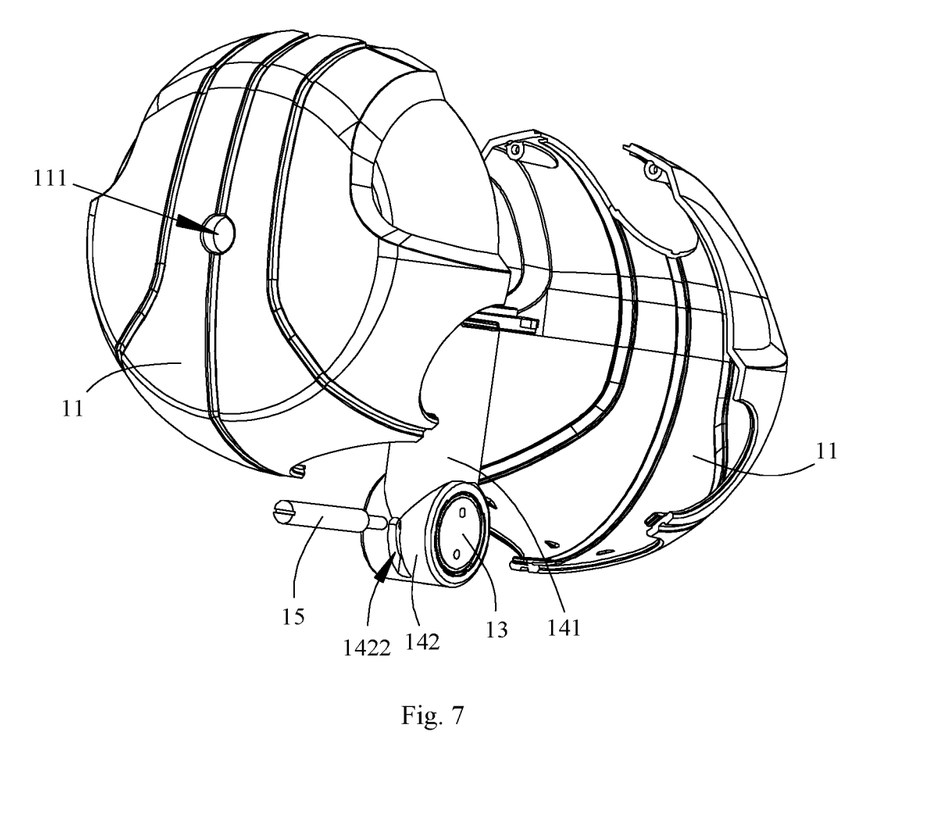
FIG. 7 illustrates an exploded view of a part of the panorama stitching camera in FIG. 2.
Figure 8:
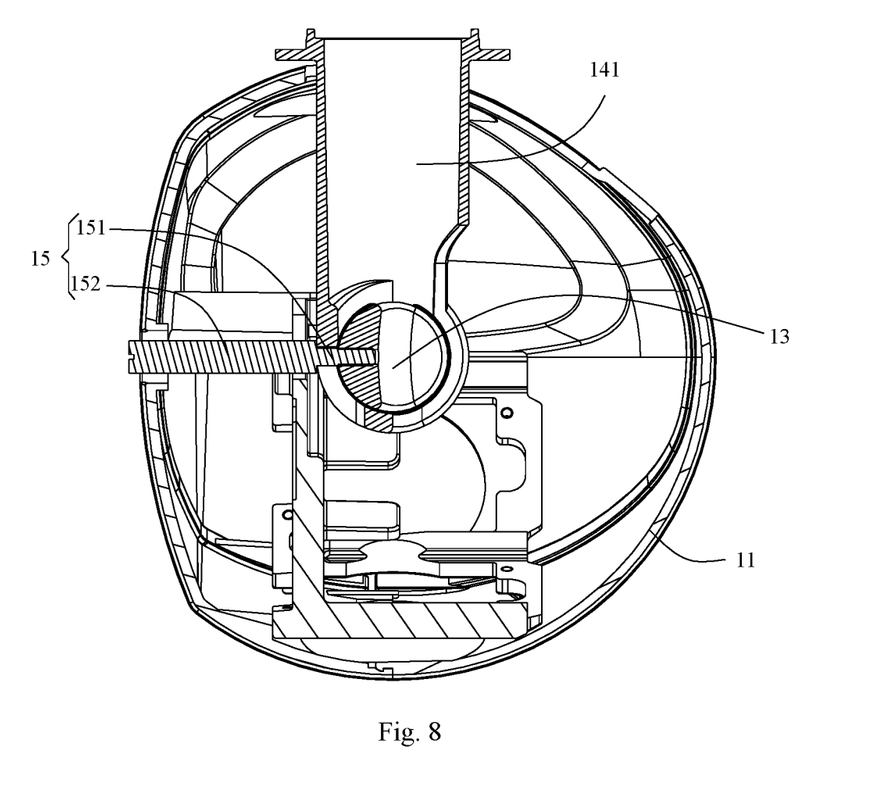
FIG. 8 illustrates a full section view of a part of the panorama stitching camera in FIG. 2.

Furthermore, as shown in FIG. 7, the waist region of the pivot tube 142 corresponding to the internal teeth 1421 is provided with a through-hole 1422 that extends circumferentially. The panorama stitching camera 1 further includes a locking bar 15 mounted in the though-hole 1422, which is perpendicular to the axis of the pivot tube 142 and protrudes from the pivot tube 142. A part of the locking bar 15 passes through the through-hole 1422 and is detachably connected to the ball core adjustment shaft 13. In this embodiment, as shown in FIG. 8, the locking bar 15 includes a threaded segment 151 and a protruding segment 152. The threaded segment 151 passes through the through-hole 1422 and is connected to a threaded hole on the ball core adjustment shaft 13.

Optionally, as shown in FIGS. 7 and 8, the through-hole 1422 is a bar-shaped hole that extends along the circumferential direction of the pivot tube 142. The portion on the ball core adjustment shaft 13 corresponding to the through-hole 1422 is provided with a threaded hole that mates with the threaded segment 151 of the locking bar 15. The threaded segment 151 of the locking bar 15, after being inserted into and passing through the through-hole 1422, is screwed into the threaded hole in order to connect the locking bar 15 to the ball core adjustment shaft 13. When rotating in the pivot tube 142, the ball core adjustment shaft 13 drives synchronically the locking bar 15 to move in the through-hole 1422. The protruding segment 152 is an optical shaft and is provided with a straight slot or a cross slot on its end face, so that the locking bar 15 can be screwed up by using a screw driver.

The maximum external diameter of the threaded segment 151 of the locking bar 15 is smaller than the size of the through-hole 1422 in the axial direction of the pivot tube 142, and the minimum external diameter of the protruding segment 152 is larger than the size of the through-hole 1422 in the axial direction of the pivot tube 142. When the internal teeth 1421 and the external teeth 131 are engaged with each other, a part of the wall of the pivot tube 142 is clamped by the step face of the locking bar 15 and the outer peripheral face of the ball core adjustment shaft 13 to ensure that the engagement is stable and reliable.

When the adjustment of orientations of the lenses 121 is desired, the locking bar 15 is unscrewed so that a part of the threaded segment 151 of the locking bar 15 can exit from the threaded hole of the ball core mechanism shaft 13. When the vertical distance from the step face between the threaded segment 151 and the protruding segment 152 to the outer peripheral face of the pivot tube 142 is larger than the height required for engaging the internal teeth 1421 with external teeth 131, the ball core mechanism is pushed to push the external teeth 131 away from the internal teeth 1421, so that the internal teeth 1421 are disengaged from the external teeth 131. At this time, the ball core mechanism shaft 13 is freely rotatable in the pivot tube 142, and thus the operator can rotate the lenses 121 to a predetermined position.

After the panorama stitching camera 1 is adjusted to the predetermined position, the locking bar 15 is screwed so that the threaded segment 151 of the locking bar 15 is screwed into the threaded hole gradually. Therefore, the external teeth 131 of the ball core mechanism shaft 13 are pulled toward the internal teeth 1421 disposed on the inner wall of the pivot tube 142 and eventually engage with the internal teeth 1421. After the external teeth 131 engage with the internal teeth 1421, the step face between the threaded segment 151 and the protruding segment 152 of the locking bar 15 will abut against the outer peripheral face of the pivot tube 142, so that the ball core adjustment shaft 13 is tensed to prevent the disengagement of the external teeth 131 from the internal teeth 1421. At this time, the ball core adjustment shaft 13 is locked in the pivot tube 142 and thus is not able to rotate in the pivot tube 142, so that the orientations of the lenses 121 after the panorama stitching camera 1 is adjusted to the predetermined position will not change.

Optionally, the through-hole 1422 is a circular hole. The main shaft 14 is provided with a plurality of circular holes distributed circumferentially and spaced apart from each other. The ball core adjustment shaft 13 is provided with one threaded hole. This threaded hole may be aligned with circular holes on different positions when the ball core adjustment shaft 13 rotates relative to the pivot tube 142, so that the locking bar 15 passes through the circular hole and connects with the ball core adjustment shaft 13. The rotation range of the fixing frame 12 can be adjusted by varying the number of the circular holes and the space between two adjacent holes.

When the relative position of the ball core adjustment shaft 13 and the pivot tube 142 needs to be adjusted, the locking bar 15 is first unscrewed completely from the threaded hole and then the ball core adjustment shaft 13 is rotated in order to align the locking bar 15 with another threaded hole. The threaded segment 151 of the locking bar 15 is then screwed into the threaded hole so that the relative position of the ball core adjustment shaft 13 and the pivot tube 142 is fixed. It is appreciated that the technical effect of the above scheme can also be achieved with a pivot tube 142 having one or more circular holes and a ball core adjustment shaft 13 having a plurality of threaded holes. The threaded segment 151 of the locking bar 15 has a maximum external diameter that is smaller than the diameter of the circular hole and the protruding segment 152 has a minimum external diameter that is larger than the diameter of the circular hole. When the internal teeth 1421 engage with the external teeth 131, a part of the wall of the pivot tube 142 is clamped by the step face of the locking bar 15 and the outer peripheral face of the ball core adjustment shaft 13 to ensure that the engagement is stable and reliable.

In this embodiment, a plurality of internal teeth are distributed circumferentially in at least a part of the entire circumference of the inner wall of the pivot tube 142. A plurality of external teeth 131 are distributed circumferentially in at least a part of the entire outer peripheral face of the ball core adjustment shaft 13. Preferably, the internal teeth 1421 are distributed circumferentially on half of the circumference of the inner wall of the pivot tube 142, and the external teeth 131 are distributed circumferentially on half of the outer peripheral face of the ball core adjustment shaft 13. As such, the internal teeth 1421 engage with or disengage from the external teeth 131 more easily.

The size of the extension of the through-hole 1422 in circumferential direction is smaller than that of the distribution of the internal teeth 1421 in circumferential direction. The line between the midpoint of the extension of the through-hole 1422 in circumferential direction and the midpoint of the distribution of the internal teeth 1421 in circumferential direction is parallel to the axis of the pivot tube 142. With such a through-hole 1422, the traveled distance of the locking bar 15 in circumferential direction is smaller than the size of the distribution of the internal teeth 1421 in circumferential direction, so that the locking bar 15 limits the rotation range of the ball core adjustment shaft 13, and thus the swing range of the fixing frame 12. This also prevents the internal teeth 1421 and the external teeth 131 from totally disengaging from each other due to excessive rotation range of the ball core adjustment shaft 13, so that there is always an engagement area between the internal teeth 1421 and the external teeth 131. Thus, a valid engagement is ensured and the operator can easily adjust the lenses 121.

The distance between two adjacent internal teeth 1421 is larger than the distance between two adjacent external teeth 131 so that the molding of the internal teeth 1421 can be easier and the cost can be reduced.

Each of the internal teeth 1421 and each of the external teeth 131 are a tapering projection with a triangular cross section. As such, the top of an external tooth 131 will be directed automatically to fit into the bottom of an internal tooth 1421 when it abuts against the waist of the internal tooth 1421. The reliability of engagement is thus ensured.

Figure 5:
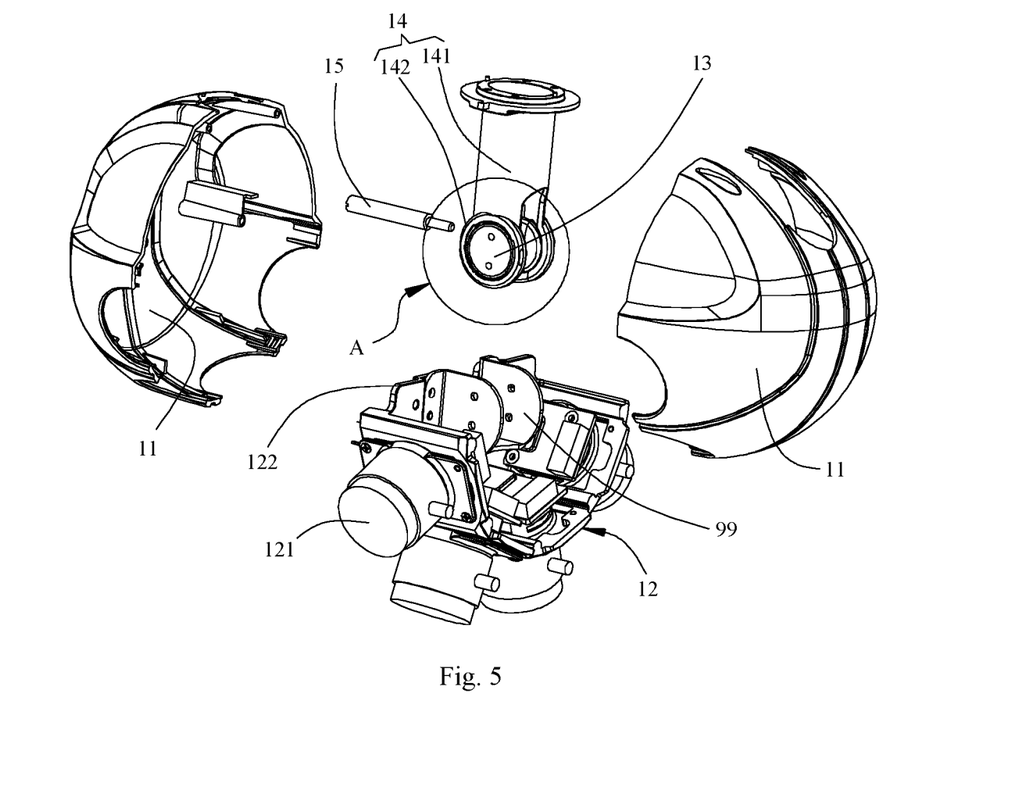
FIG. 5 illustrates an exploded view of a part of the panorama stitching camera in FIG. 2.

Furthermore, as shown in FIG. 5, the supporting plates 122 include connectors 99 that connects with two end faces of the ball core adjustment shaft 13. The ball core adjustment shaft 13 is mounted onto the supporting plates 122 by the connectors 99. A connector 99 includes a first mounting arm and a second mounting arm that are perpendicular to each other. The first mounting arm is connected with an end face of the ball core adjustment shaft 13 by a bolt. The second mounting arm is connected with a supporting plate 122 by a bolt. As such, the supporting plate 122 has a simple overall structure, as well as reduced complexity and cost.

Furthermore, a central hole of the pivot tube 142 is a stepped hole. The internal teeth 1421 are disposed on the wall of a first stepped hole with a larger diameter. The ball core adjustment shaft 13 is a stepped shaft. The external teeth 131 are disposed on the outer peripheral face of a first stepped shaft with a larger diameter. The second stepped shaft 13 will be inserted into a second stepped hole and the first stepped shaft will be inserted into the first stepped hole after the ball core adjustment shaft 13 is inserted into the pivot tube. The step face of the ball core adjustment shaft 13 contacts with the step face of the pivot tube in order to position the ball core adjustment shaft 13 in the axial direction to ensure an accurate engagement between the internal teeth 1421 and the external teeth 131.

The fixing frame 12, the connectors 99, the ball core adjustment shaft 13, and the pivot tube 142 are all located in the ball core cap 11. A part of the shaft lever 141 of the main shaft 14 protrudes from the ball core cap 11. The ball core cap 11 is provided with a bar-shaped via. The main shaft 14 can move relatively along the bar-shaped via when the panorama stitching camera 1 is undergoing a swing adjustment. As shown in FIG. 3, the ball core cap 11 is provided with a via 111 through which the protruding segment 152 of the locking bar 15 passes, so that it would be easy for the operator to control the clutch structure of the ball core mechanism with a tool, such as a screw driver, from the outside of the ball core cap 11.

Furthermore, the fixing plate 23, the main shaft 14, the fixing frame 12, and the lens holders 144 are all metallic members. As a result, external surfaces of most of the elements within the panorama stitching camera 1 are electrically connected with each other. The static within the panorama stitching camera 1 are thus eliminated. In addition, the fixing plate 23, the main shaft 14, the fixing frame 12, and the lens holders 144 are connected in sequence so that the lens holders 144 can transfer the heat produced by the lenses 121 to the fixing plate 23 which serves to dissipate the heat. Thus, the ability of the panorama stitching camera 1 in terms of heat dissipation is enhanced and the reliability of the panorama stitching camera 1 is improved.

Furthermore, the panorama stitching camera 1 further includes a heater 5 disposed on the fixing frame 12. The heater 5 is preferably an electrical heater. The heater 5 is used to heat a plurality of lenses 121 simultaneously. Since the lenses 121 can be heated by the heater 5, the panorama stitching camera 1 is able to operate at low temperature. Thus, the application of the panorama stitching camera 1 is broadened.

Furthermore, the shaft lever 141, the pivot tube 142, and the ball core adjustment shaft 13 are provided with a routing channel connecting with internal space of the ball core cap 11. The routing channel includes a central hole of the shaft lever 141 and recesses disposed at the waists of the pivot tube 142 and the ball core adjustment shaft 13. The routing channel facilitates the arrangement of cables and hide the cables connecting to the ball core mechanism, thus the panorama stitching camera 1 has a better appearance.

The panorama stitching camera 1 whose shooting orientation is easy to be adjusted according to this embodiment includes a ball core mechanism and a ball core cap 11 accommodating the ball core mechanism. The ball core mechanism includes a clutch structure used to adjust the orientation of the lenses 121. The clutch structure makes the process of adjusting the orientation of the lenses 121 by the operator simple, convenient and rapid, and thus time and effort are saved. The overall structure of the ball core mechanism is compact and occupies a less space.

Although the present application has been described with reference to preferred embodiments, various modifications can be made to these embodiments and components therein can be substituted by various equivalents, without departing from the scope of the present application. In particular, any combination of the various technical features described with reference to individual embodiments is possible as long as no confliction in structure occurs. The present application is

What is claimed is:

1. A panorama stitching camera, comprising: a base provided with a fixing plate; a main shaft passing vertically through the fixing plate, the main shaft being rotatable around an axis of the main shaft; and a plurality of lenses disposed at one end of the main shaft;
   wherein, a limiting protrusion and a shaft end retaining ring that abut respectively against two opposite sides of the fixing plate are disposed at the other end of the main shaft,
   wherein, the shaft end retaining ring comprises an elastic diaphragm that is connected to an end of the main shaft and parallel to the fixing plate, and a convex ring that protrudes toward the fixing plate from one side of the elastic diaphragm and abuts against the fixing plate.

2. The panorama stitching camera of claim 1, wherein, the elastic diaphragm is ring-shaped, and the elastic diaphragm, the main shaft, and the convex ring have the same axis.

3. The panorama stitching camera of claim 2, wherein, the shaft end retaining ring further comprises a sleeve that protrudes from another side of the elastic diaphragm in a direction away from the fixing plate and has the same axis and inner diameter as the convex ring.

4. The panorama stitching camera of claim 3, further comprising a heater disposed at the end of the main shaft at which the lenses are disposed, wherein the heater is configured to heat the plurality of lenses simultaneously.

5. The panorama stitching camera of claim 3, further comprising a fixing frame, a plurality of lens holders disposed on the fixing frame, and a ball core adjustment shaft fixed on the fixing frame, wherein, the ball core adjustment shaft is pivotally connected to the main shaft, and each of the plurality of lenses is mounted on one of the plurality of lens holders.

6. The panorama stitching camera of claim 3, wherein, the elastic diaphragm is a corrugated diaphragm.

7. The panorama stitching camera of claim 2, further comprising a heater disposed at the end of the main shaft at which the lenses are disposed, wherein the heater is configured to heat the plurality of lenses simultaneously.

8. The panorama stitching camera of claim 2, further comprising a fixing frame, a plurality of lens holders disposed on the fixing frame, and a ball core adjustment shaft fixed on the fixing frame, wherein, the ball core adjustment shaft is pivotally connected to the main shaft, and each of the plurality of lenses is mounted on one of the plurality of lens holders.

9. The panorama stitching camera of claim 2, wherein, the elastic diaphragm is a corrugated diaphragm.

10. The panorama stitching camera of claim 1, further comprising a heater disposed at the end of the main shaft at which the lenses are disposed, wherein the heater is configured to heat the plurality of lenses simultaneously.

11. The panorama stitching camera of claim 1, further comprising a fixing frame, a plurality of lens holders disposed on the fixing frame, and a ball core adjustment shaft fixed on the fixing frame, wherein, the ball core adjustment shaft is pivotally connected to the main shaft, and each of the plurality of lenses is mounted on one of the plurality of lens holders.

12. The panorama stitching camera of claim 11, wherein, a pivot tube is disposed at an end of the main shaft facing away from the fixing plate; an inner wall of the pivot tube is provided with internal teeth; the ball core adjustment shaft is rotatably disposed in the pivot tube; and an outer peripheral face of the ball core adjustment shaft is provided with external teeth that engage with the internal teeth.

13. The panorama stitching camera of claim 12, wherein, a gap greater than a height required for engaging the internal teeth with the external teeth is formed between the ball core adjustment shaft and the inner wall of the pivot tube; a part of the pivot tube on which the internal teeth are disposed is provided with a through-hole extending radially; a locking bar perpendicular to the axis of the pivot tube and protruding from the pivot tube is mounted in the through-hole; and the locking bar is detachably connected to the ball core adjustment shaft.

14. The panorama stitching camera of claim 13, wherein, the locking bar comprises a threaded segment and a protruding segment, wherein the threaded segment passes through the through-hole and is screwed to the ball core adjustment shaft, and the minimum external diameter of the protruding segment is larger than the size of the through-hole in an axial direction of the pivot tube.

15. The panorama stitching camera of claim 11, wherein, the fixing plate, the main shaft, the fixing frame, and the lens holders are all metallic members.

16. The panorama stitching camera of claim 1, wherein, the elastic diaphragm is a corrugated diaphragm.

17. The panorama stitching camera of claim 1, further comprising a heater disposed at the end of the main shaft at which the lenses are disposed, wherein the heater is configured to heat the plurality of lenses simultaneously.

18. The panorama stitching camera of claim 1, further comprising a fixing frame, a plurality of lens holders disposed on the fixing frame, and a ball core adjustment shaft fixed on the fixing frame, wherein, the ball core adjustment shaft is pivotally connected to the main shaft, and each of the plurality of lenses is mounted on one of the plurality of lens holders.

* * * * *